2,802,014

8(14)-PREGNENES AND PROCESS

Gerald D. Laubach, Jackson Heights, N. Y., assignor to Chas. Pfizer & Co., Inc., New York, N. Y., a corporation of Delaware No Drawing. Application July 27, 1954, Serial No. 446,158

8 Claims. (Cl. 260—397.45)

This invention is concerned with the selective reduction of steroids and with preparation of a new class of 11-oxygenated 8(14)-unsaturated compounds useful in the synthesis of cortisone, compound F and similar cortical hormones. This application is a continuation-in-part of application Serial No. 276,049 filed on March 11, 1952 and now abandoned.

In the synthesis of biologically active materials from certain naturally occurring steroids, especially those from vegetable sources, intermediates are obtained which possess, at both the 9-position and the 11-position of the nucleus, either hydroxyl groups or other oxygen functions derived from OH, such as esters or ethers. Retention of the C11 oxygen but removal of that at C9 is greatly desired to obtain valuable therapeutic agents, but often presents considerable difficulty. At the same time, also, the 9,11-oxygenated intermediates are generally further oxygenated at C3, and retention of this substituent is important in producing cortison. Further, there are often nuclear double bonds in the intermediates, the fate of which may or may not be important in the ultimate cortical hormone product. For instance, a 6(7) unsaturation is usually expendable, while it is sometimes advantageous to retain an 8(14) double bond.

It is among the objects of this invention to facilitate the synthetic preparation of cortical hormones. A particular object is to provide a method for selectively removing the C9 oxygenated substituent from a 9,11-oxygenated steroid. Another object is to reduce a C9 oxygen function of a steroid without affecting a C11 oxygen or an 8(14)-unsaturation. A further object is to prepare a new and valuable class of cortisone intermediates which are 3,11-dioxygenated 8(14)-unsaturated steroids. Other objects will be apparent from a study of the ensuing description.

These and other objects are realized by the present invention which broadly comprises reacting an 8(14)-unsaturated 9,11-oxygenated steroid with hydrogen under mildly acidic conditions in the presence of a noble metal catalyst. The C9 oxygen function is thereby selectively reduced, while the C11 oxygen is peculiarly enough, not attacked. If the initial 9,11-oxygenated steroid is 8(14)-unsaturated, this double bond group is also, surprisingly, not attacked but appears in the product. If the steroid reactant, however, is unsaturated further at, say, C6–7, this double bond is effectively reduced by the hydrogenation. If the reactant is 3,9,11-trioxygenated 8(14)-unsaturated, then this process results in the new class of compounds previously mentioned, 3,11-dioxygenated 8(14)-unsaturated steroids. The strange selectivity of this novel method is thus clearly shown. A C3 oxygen, and/or an 8(14) double bond, and a C11 oxygen are untouched by hydrogen, while a C9 oxygen is readily and efficiently removed.

According to certain specific embodiments of this invention, steroids bearing an hydroxyl group or a group readily hydrolyzable to hydroxyl at the 3-, 9- and 11-positions, and unsaturated at the 6, 7 and 8(14)-positions or at just C8(14) are selectively hydrogenated to yield 8(14)-nuclear monounsaturated 3,11-oxygenated compounds. The hydrogen treatment is effected in the presence of a noble metal catalyst, preferably platinum or palladium, and either in an organic solvent system containing a mild organic acid, or in a glacial acetic acid solution (the latter acting both as the solvent and as the requisite acid). Various other groups can be substituted on the steroid nucleus and may or may not be reduced by the hydrogen, without untoward effect on the basic value of the new concept. For instance, the 17-position of the nucleus may bear an alkylene group such as occurs in ergosterol and other vegetable-type compounds, or it may bear a short oxygenated side chain like those present in cortisone itself and similar biologically active steroids. The 22—23 double bond of the ergosterol type compound may be reduced under the new hydrogenation conditions, but the critical feature is that the C11 oxygen function and an 8(14) double bond, if present, will pass unscatched through the treatment.

The reactions outlined above may be more clearly understood by reference to the following formulas, which designate certain preferred reactants and reaction products. I is a 3,9,11-trioxygenated 6,8(14)-nuclear diunsaturated vegetable-type steroid; II represents the corresponding 8(14)-nuclear monounsaturated compounds; III shows the 3,11-dioxygenated 8(14)-monounsaturated product resulting from hydrogenation of either I or II by the process of this invention.

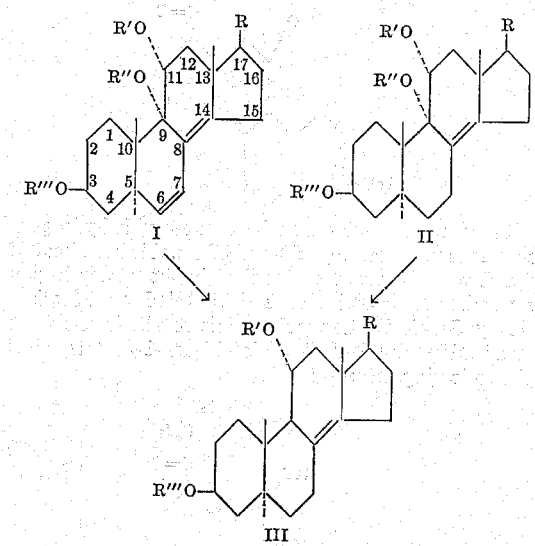

In the above formulas R may be

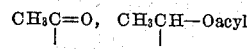

where the acyl group may be, for example, acetyl, propionyl, hexahydrobenzoyl or acid succinyl, alkyl, such as methyl or ethyl, alkylene, for example the group $C_9H_{17}$ which occurs in ergosterol,

and groups of this nature. R', R" and R'" may be either acyl, such as acetyl or propionyl, alkyl, such as methyl or ethyl, or hydrogen, and may be alike or different. Particularly good results are obtained when all three groups, or at least R", are hydrogen. Esterification of such hydroxyl groups may be selectively accomplished by the usual acylating agents, for example, acetic anhydride, ketone, benzoyl chloride and so forth. As previously discussed, the type of compound represented by III is hitherto unknown. Compounds I and II have been described and claimed in a copending patent application Serial No. 249,014, filed on September 29, 1951 by Gerald D. Laubach et al.

A specific example of the utility of the process of this invention is in the production of cortisone. For instance, this process is useful in converting such a material as ergosta-6,8(14),22-triene-3,9,11-triol-3-acetate to cortisone. The first step is to convert the 17-position side chain of the starting material to a —COCH$_3$ group. This is accomplished by treating with ozone, reductively cleaving the resulting ozonide, treating the aldehyde so obtained with piperidine in mild acid to form an eneamine, and oxidizing the eneamine with CrO$_3$ to obtain the ketone. The overall result of this is shown by the following formulas:

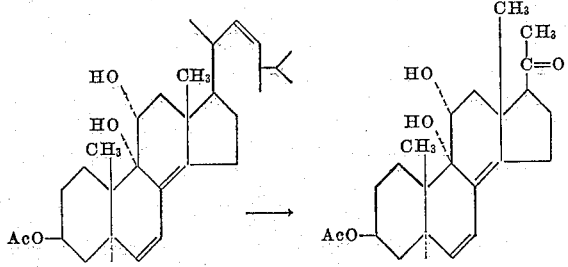

This product is then subjected to the process of the present invention. The resulting product has the following formula:

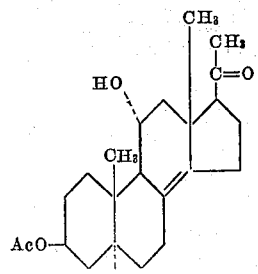

This compound may then be treated with hydrogen in the presence of a strong acid and of a noble metal catalyst according to the process described in the presently pending application Serial No. 276,050 filed on March 11, 1952 by Gerald D. Laubach. This results in the formation of allopregnane-3β,11α-diol-20-one-3-acetate, shown in the following formula:

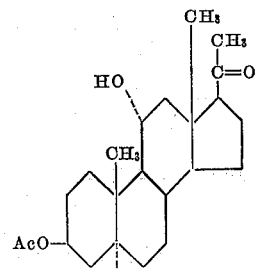

This compound is a known intermediate for the synthesis of cortisone.

In carrying out the new hydrogenation process it is preferred to employ temperatures of from about 15° to about 35° C., although somewhat higher temperatures are not deleterious. Hydrogen pressures of from slightly below about one atmosphere to about ten atmospheres are suitable. Generally speaking, room temperatures and atmospheric pressures are simplest and fully satisfactory. The reaction normally either completely stops or is markedly reduced in rate when the theoretical amount of hydrogen required for attacking the particular reducible groups present has been utilized. The products of the reaction may be isolated with relative ease; preferably, the catalyst is filtered and the solvent removed under vacuum. In many cases the products are obtained at once in crystalline form when the solvent is merely removed thus. In other cases it may be desirable to subject the material to conventional purification procedures, such as crystallization from a second solvent or chromatography.

Various types of noble metals can be employed in the new treatment. Palladium and platinum catalysts are especially good and preferred, but iridium, osmium, rhodium and the like are also operable. The material known as Adams platinum oxide is particularly useful, and palladium-on-charcoal catalysts also are very effective. The proportion of catalyst to reactants may vary widely, but roughly between 3% and 300% by weight of the steroid is generally satisfactory and between about 10% and 50% is a preferred range.

The hydrogenation should be conducted in a liquid system, as hereinbefore mentioned. Excellent organic solvents are ethyl acetate, the lower alcohols, chloroform and other halogenated hydrocarbons, saturated hydrocarbons such as hexane, and generally any compound which will dissolve the steroid and organic acid, and yet not itself enter into deleterious side reactions. Alternatively, the reactions may be run in glacial acetic acid, which functions both as solvent and as the necessary mild acid.

In conducting the reactions of this invention, the mildly acidic solutions which are necessary for the selective hydrogenation may be prepared in several ways. A strong inorganic acid may be used, such as concentrated hydrochloric acid or concentrated sulfuric acid. However, such an acid is used at a concentration of one percent or less in an inert organic solvent. If a strong organic acid, such as chloracetic acid, benzenesulfonic acid, trichloracetic acid or toluenesulfonic acid is used, it should be present in a somewhat higher concentration, for example up to about five percent is suitable. Somewhat higher concentrations are not deleterious. If a weaker organic acid, such as acetic acid, propionic acid and so forth is used, it should be present in a concentration of at least about 25 percent in order to achieve the desired results. The rate of hydrogenation in any of the systems may be increased by the addition of trace amounts of strong mineral acids. The weaker organic acids, which may be used for our process, have ionization constants in a range of that of acetic acid ($1.75 \times 10^{-5}$) and the strong organic acids have ionization constants in the range of about $10^{-1}$.

The following examples are given by way of illustration and are not to be considered as limitations of this invention. Indeed, as many apparently widely different embodiments of the present invention may be made without departing from the spirit and scope hereof, it is to be understood that this invention is not limited, except as defined in the appended claims.

EXAMPLE I

Ergosta-8(14)-ene-3β,11α-diol 3-acetate

A solution of 118 mg. (0.00025 mole) of ergosta-6,8(14),22-triene-3β,9α,11α-triol 3-acetate in 12 ml. of glacial acetic acid was hydrogenated over 0.200 gram of pre-reduced platinum oxide catalyst. After an uptake of 18.7 ml. (102% of three moles) of hydrogen, absorption abruptly ceased. The catalyst was removed by filtration and the combined filtrate and washings were concentrated at 50° C. under vacuum to a clear oil. Washing with water and addition of 3 ml. of methanol resulted in crystallization to a white solid. Recrystallization of this solid from 2 ml. of methanol afforded a first crop of thin nacreous plates, melting point 100.4–105.0° C., yield 19.5 mg. (18%). Mixed melting point determination showed this material to be ergosta-8(14)-ene-3β-ol acetate, a by-product.

From the residual mother liquors there separated on standing thin needles, melting point 122.4–125.2° C., yield 63.0 mg. (55%). This product was determined by analysis of a recrystallized sample, melting point 125.5–126.8° C., to be the desired 3,11-dioxygenated 8(14)-nuclear monounsaturated compound.

*Anal.*—Calcd. for $C_{30}H_{46}O_3$: C, 78.55; H, 10.99. Found: C, 78.80; H, 11.05.

A similar reaction was carried out using 0.5 gram of palladium-on-charcoal (5% Pd) catalyst in glacial acetic acid. On chromatography the identical product resulted, melting point 122.2–123.0° C.

EXAMPLE II

*Ergosta-8(14)-ene-3β,11α-diol diacetate*

A solution of 0.129 gram (0.00025 mole) of ergosta-8(14)-ene-3β,9α,11α-triol 3,11-diacetate (melting point 127.0–129.2° C.) in 10 mls. of redistilled glacial acetic acid was hydrogenated over 0.20 gram of pre-reduced platinum oxide catalyst. Over a period of several hours, 6.4 mls. (105% of one mole) of hydrogen was absorbed and hydrogen uptake then ceased. The filtered reaction mixture was concentrated in vacuo to a clear oil which spontaneously crystallized. After trituration with 6 mls. of 5 to 1 methanol-water mixture, the white product was filtered. The needle-shaped crystals weighed 0.115 gram (92%) and the product melted at 100.0–106.2° C.

A sample was recrystallized twice. The long, white needles melted at 108.7–111.0° C., $[\alpha]_D^{25} = -42.2°$ (in chloroform).

*Anal.*—Calcd. for $C_{32}H_{52}O_4$: C, 76.75; H, 10.47. Found: C, 77.03; H, 10.25.

EXAMPLE III

*Ergosta-8(14)-ene-3β,11α-diol diacetate*

A solution of 0.62 gram of ergosta-6,8(14),22-triene-3β,9α,11α-triol 3,11-diacetate in 22 ml. of acetic acid was hydrogenated over 0.50 grams of platinum oxide catalyst that had previously been reduced. After 170 minutes, the theoretical quantity of hydrogen (3 moles) had been absorbed. The material was recovered as in Example II above and an identical product was obtained.

The above reaction was repeated using a solution of the triol diacetate in methanol containing 5% trichloracetic acid. Exactly the same results were obtained.

EXAMPLE IV

The procedure of Example I was repeated numerous times, except that in place of the acetyl group present at position 3 in Example I, the free OH group and various ester and ether groups were used. The used esters included the propionate, hemisuccinate and hydrobenzoate, and the ethers included the methyl and ethyl. In all cases the change in the group at the 3 position had no effect on the overall reaction which proceeded as before, and the 3 position group itself came through the reaction unchanged.

What is claimed is:

1. A process for preparing a compound having the formula

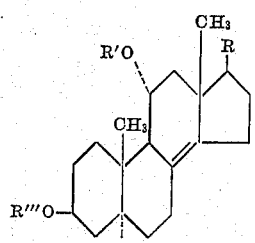

which process comprises reacting a steroid compound selected from the group consisting of

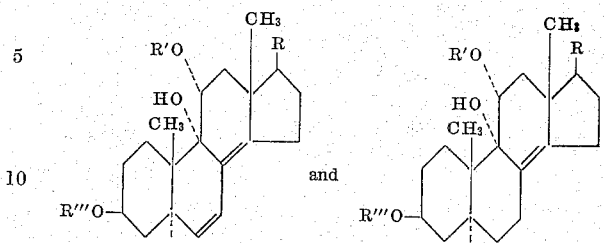

where in the above formulas R is a member of the group consisting of —COCH₃, $CH_3CHO$ acetyl, $CH_3CHO$ propionyl $CH_3CHO$-hexahydrobenzoyl, $CH_3CHO$ hemisuccinyl and

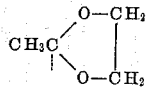

and R' and R''' are selected from the group consisting of hydrogen, acetyl, propionyl, hexahydrobenzoyl and hemisuccinyl, with hydrogen under mildly acidic conditions in the presence of a noble metal catalyst.

2. A process according to claim 1 wherein the reaction is conducted in an organic solvent system in the presence of a noble metal catalyst.

3. A process according to claim 1 wherein the reaction is conducted in glacial acetic acid solution in the presence of a noble metal catalyst.

4. A process according to claim 1 wherein the catalyst is platinum.

5. A process according to claim 1 wherein the catalyst is palladium.

6. Steroid compounds having the formula

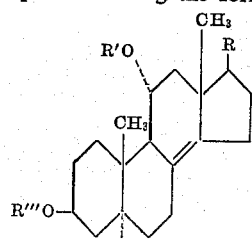

wherein R is a member of the group consisting of $CH_3C=O$ $CH_3CHO$ acetyl, $CH_2CHO$ propionyl $CH_3CHO$-hexahydrobenzoyl, $CH_3CHO$ hemisuccinyl and

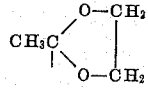

and R' and R''' are selected from the group consisting of hydrogen, acetyl, propionyl, hexahydrobenzoyl and hemisuccinyl,.

7. Compounds according to claim 6 wherein at least one of the radicals R' and R''' is hydrogen.

8. Compounds according to claim 6 wherein R is —COCH₃.

References Cited in the file of this patent

UNITED STATES PATENTS 2,588,608   Bernstein _____ Mar. 11, 1952

FOREIGN PATENTS 848,797   France _____ July 31, 1939

OTHER REFERENCES

Bladen: Jour. Chem. Soc., London 1952, 4883–4890.
Heusser: Helv. Chim. Acta 35, 936–950 (1952).